(12) United States Patent
Peggs et al.

(10) Patent No.: US 6,418,675 B1
(45) Date of Patent: Jul. 16, 2002

(54) LANDSCAPING TIMBER SYSTEM

(75) Inventors: Carl Anderson Peggs, Mooresville; Harold A. Layne, Carolina Beach, both of NC (US)

(73) Assignee: L.P. Industries, Inc., Morresville, NC (US)

(*) Notice: Subject to any disclaimer, the term of this patent is extended or adjusted under 35 U.S.C. 154(b) by 27 days.

(21) Appl. No.: 09/704,126

(22) Filed: Nov. 1, 2000

(51) Int. Cl.⁷ .................................................. A01G 1/08
(52) U.S. Cl. ............................ 52/102; 47/33; 14/69.5
(58) Field of Search ................................ 52/102; 47/33, 47/32; 404/7, 40, 41; 256/19; 14/69.5

(56) References Cited

U.S. PATENT DOCUMENTS

| | | |
|---|---|---|
| 3,415,013 A | 12/1968 | Galbraith |
| 3,537,687 A | 11/1970 | Adelman |
| 5,168,678 A * | 12/1992 | Scott, Jr. et al. .............. 52/102 |
| 5,259,154 A | 11/1993 | Lilley |
| 5,517,708 A | 5/1996 | Baranowski |
| 5,675,930 A * | 10/1997 | Cooper ........................ 47/33 |
| 5,806,249 A * | 9/1998 | Helms ......................... 52/102 |
| 5,921,021 A | 7/1999 | Coates |
| 6,085,458 A | 7/2000 | Gau |
| 6,102,374 A * | 8/2000 | Macri .......................... 256/24 |
| 6,345,465 B1 * | 2/2002 | Allen et al. ..................... 47/33 |

* cited by examiner

Primary Examiner—Carl D. Friedman
Assistant Examiner—Jennifer I. Thissell
(74) Attorney, Agent, or Firm—Alston & Bird LLP

(57) ABSTRACT

A landscaping timber system includes a molded plastic landscaping timber having ends configured to link with ends of other such timbers via elongate spikes inserted through aligned apertures in the ends of the timbers and driven into the ground. The timber includes an integral storage compartment for storing a spike therein during storage or shipping of the timber. The timber can also include one or more weep vents in the bottom surface of the timber to allow water to flow under the timber. The system also includes a flush-mount adapter for attachment to a stepped end of a timber to give an appearance of a non-stepped end so that the timber can be mounted flush against a wall. The system further includes a ramp assembly for providing access to an area bounded by the timbers, and an end adapter enabling a timber to be cut to a desired length and attached to the adapter so as to provide a custom-length timber.

21 Claims, 3 Drawing Sheets

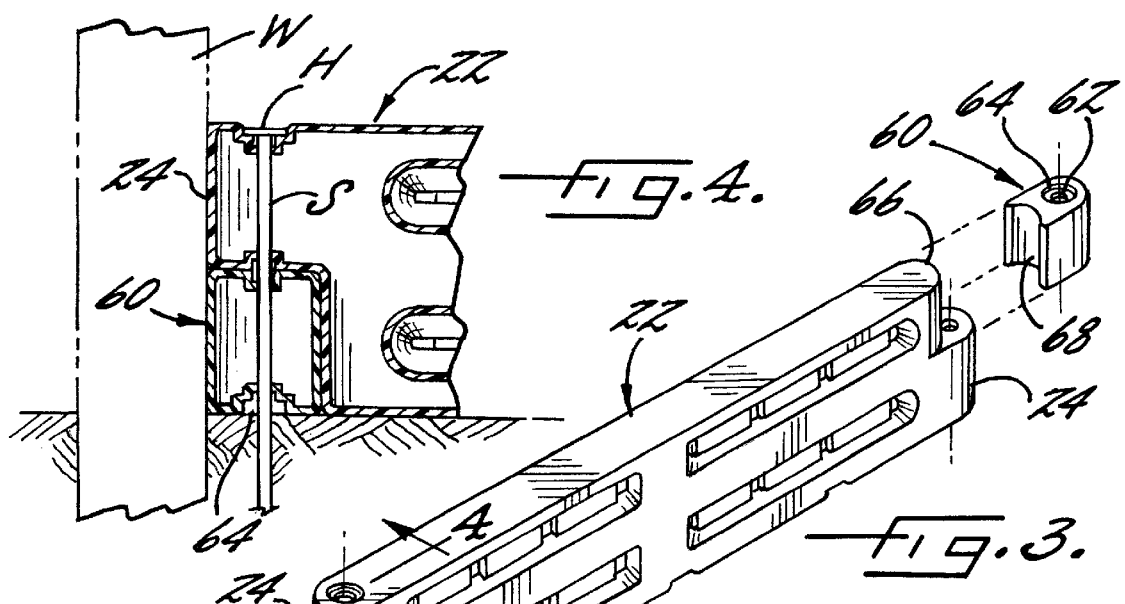
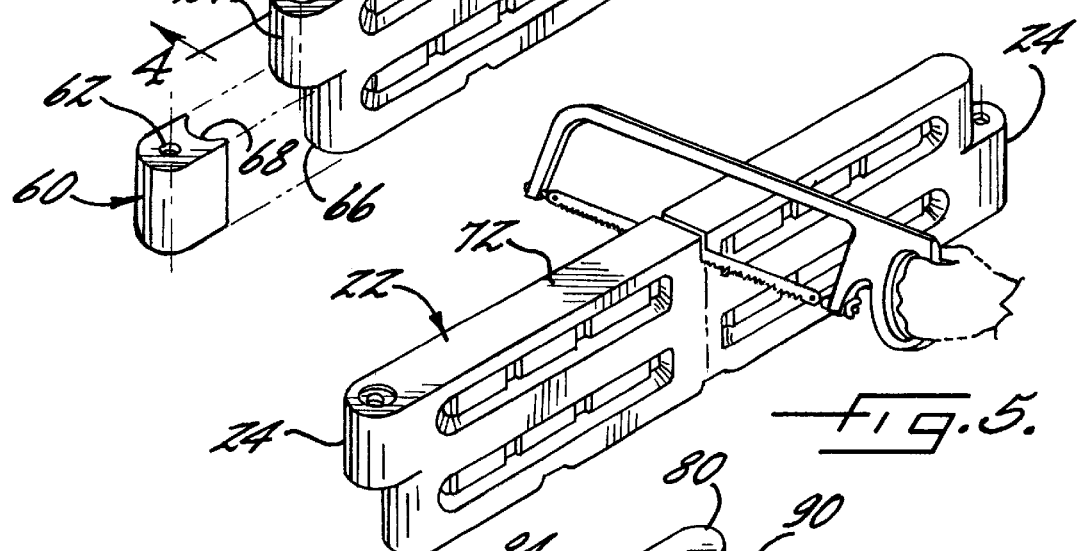
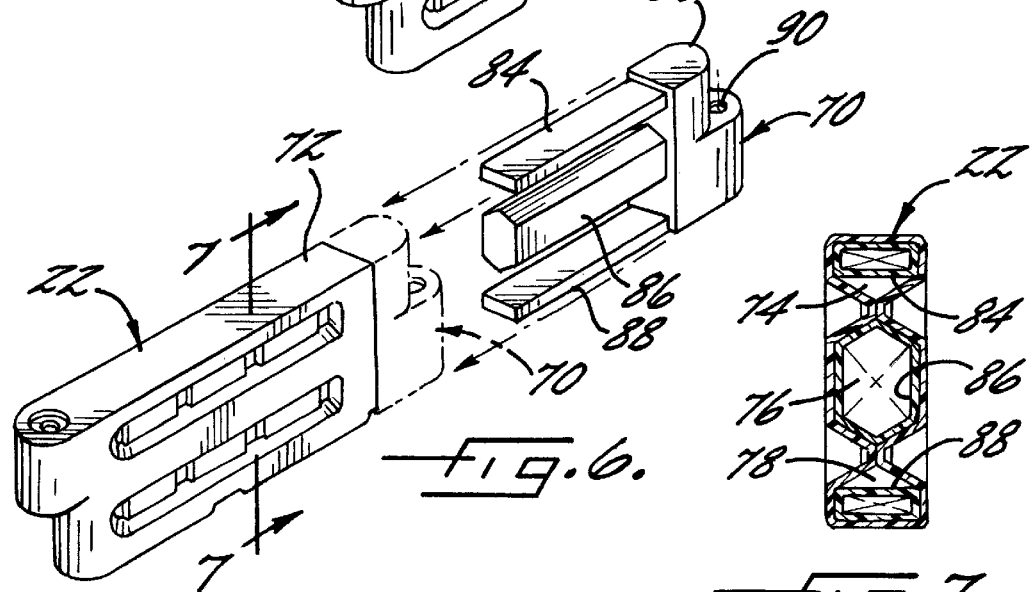

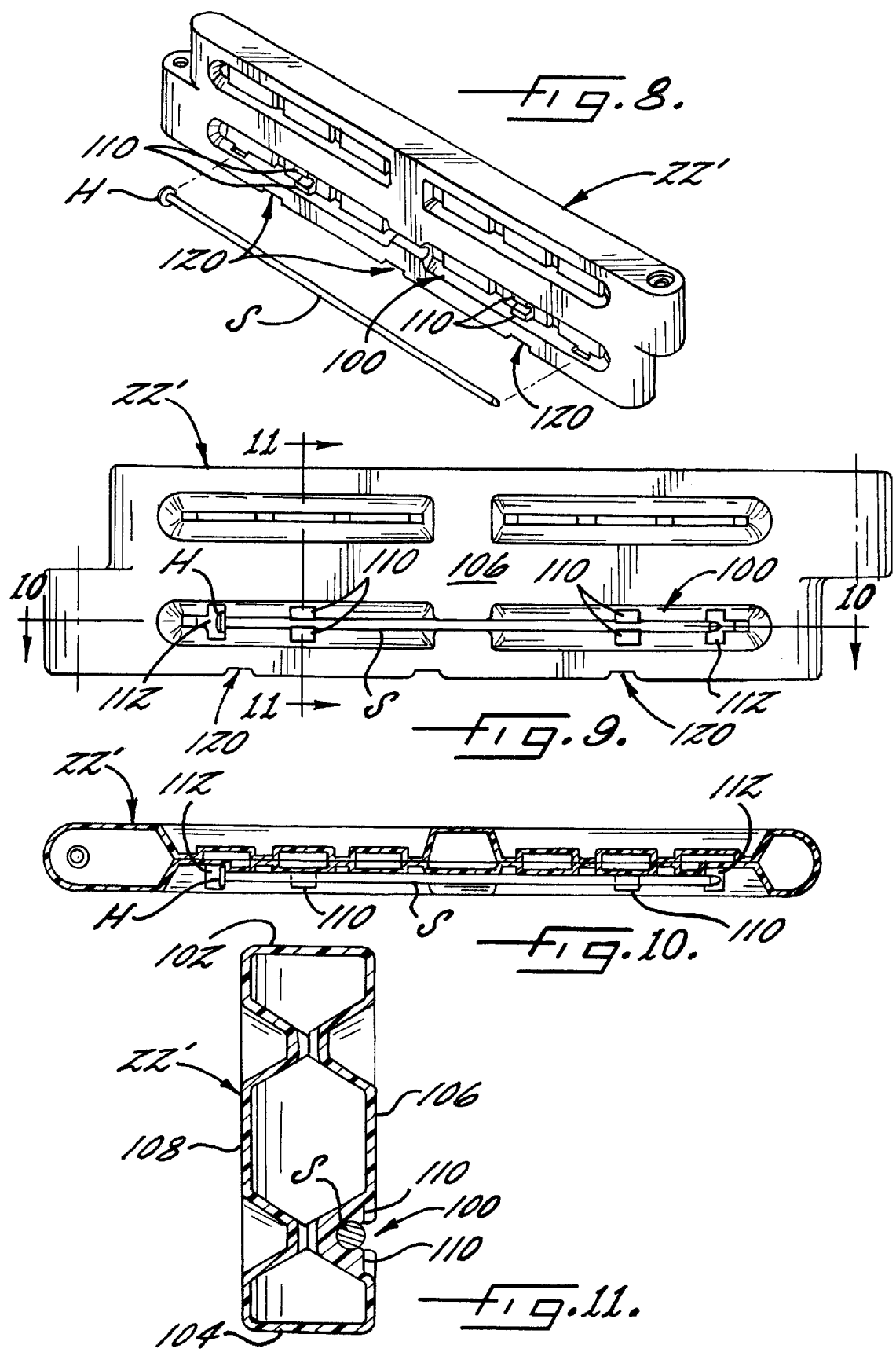

LANDSCAPING TIMBER SYSTEM

FIELD OF THE INVENTION

The present invention relates to landscaping timbers and, more particularly, to interlocking landscaping timbers that link end-to-end with the aid of long spikes that are driven through aligned apertures in the ends of two linked timbers and into the ground.

BACKGROUND OF THE INVENTION

Landscaping timbers of the above-described type are typically used for forming a barrier at an edge or around a perimeter of an area that has a layer of ground-covering material, such as shredded or chipped wood or the like. For example, children's outdoor play areas frequently have a two-inch to six-inch thick layer of shredded wood on the ground to create a shock-absorbing surface for children to land on when jumping or falling from play gyms, swing sets, or other play equipment. In this type of installation, the perimeter of the play area is usually surrounded by a barrier of landscaping timbers to contain the ground-covering material in the play area so that rain and runoff resulting from precipitation do not wash the ground-covering material out of the play area.

The landscaping timbers for children's play areas and the like typically are molded of plastic. The timbers generally have interlocking end portions that have apertures extending vertically therethrough for receiving long metal spikes. The spikes both secure the timbers to one another and also secure the timbers to the ground. Typically the spikes are two to three feet long and about three-quarters of an inch in diameter. Accordingly, the spikes are relatively heavy. When shipping a set of such landscaping timbers and spikes within the same carton, it is generally necessary to secure the spikes within the carton so that they are not free to move about. Alternatively, the spikes must be packaged in separate cartons from the timbers, which necessitates additional shipping cartons and materials. It would be desirable to eliminate the requirement of separate packaging for the spikes and the need to secure the spikes within a carton of timbers.

Another characteristic of many types of landscaping timbers is that they form a barrier not only for ground-covering material but also for water. As a result, at times of heavy rain, runoff can be trapped within the area surrounded by a chain of landscaping timbers and in low-lying areas can accumulate to sufficient depth to run over the tops of the timbers. Since many ground-covering materials are made of wood and therefore float, the materials can escape.

Many outdoor play areas having a perimeter barrier of landscaping timbers also include some type of ramp at an opening in the barrier so that persons in wheelchairs can easily enter the play area. The ramp should be securely affixed to the ground so that it does not move about.

SUMMARY OF THE INVENTION

The present invention seeks to meet the needs mentioned above. In a first aspect of the invention, a landscaping timber is provided having a storage compartment for storing an elongate spike used with the timber, such that the spike is prevented from moving relative to the timber. Thus, a set of the timbers can be packaged in a carton along with the spikes, and the spikes are prevented from shifting around in the carton. The invention thereby eliminates the necessity of undertaking separate packaging operations to secure the spikes in the carton or of using separate cartons for the spikes.

In another aspect of the invention, a landscaping timber is provided having one or more weep vents in the bottom ground-engaging surface of the timber. The timber thus allows water to flow under the timber so that the water does not accumulate and cause ground-covering material to flow over the timber.

Yet another aspect of the invention provides a ramp assembly for a landscaping timber system for providing wheelchair access to a play area or the like enclosed by the landscaping timbers. The ramp assembly includes a threshold member that mates at its opposite ends with the ends of two landscaping timbers, and a pair of wedge-shaped ramps each having an inclined upper surface that slopes upward from a thin end to a thick end of the ramp, the thick ends of the ramps being attached to the central portion of the threshold member, the ramps including apertures for receiving spikes therethrough into the ground. Preferably, the central portion of the threshold member defines a substantially horizontal support surface spaced above a ground-engaging bottom of the threshold member and having apertures for receiving spikes therethrough into the ground, and the ramps have attachment portions that overlie the support surface of the threshold member and that have apertures positioned to be aligned with the apertures in the threshold member such that spikes can be inserted through the aligned apertures and driven into the ground.

A further aspect of the invention relates to a combination of a landscaping timber and a flush-mount adapter configured to mount on an end of the timber. The timber comprises a hollow timber body extending longitudinally from a first end to a second end thereof and having a bottom face for engaging the ground and an opposite top face, and having opposite sides extending between the top and bottom faces. Each of the ends of the timber body defines an aperture for receiving an elongate rod-shaped spike therethrough such that the landscaping timber can be secured to the ground by driving the spikes through the apertures into the ground, the ends of the timber body being stepped such that the apertures are formed through end portions of the timber body having a height about half that of the timber body between the end portions. The flush mount adapter has a height about half that of the timber body between the end portions and is configured to fit onto one end portion of the timber body so as to give an appearance of a non-stepped end.

Still another aspect of the invention is directed toward an end adapter for a timber that allows the length of the landscaping timber to be reduced. The end adapter has one end configured to receive an end portion of the timber body after one of the ends of the timber body having a spike-receiving aperture is cut off. The opposite end of the adapter has an aperture for receiving the spike therethrough. Thus, the length of the timber can be tailored to the particular requirements of an installation. Preferably, the end adapter has a portion configured to be inserted into an open end of the timber body for mounting the end adapter onto the timber body. Still more preferably, the timber body includes a plurality of hollow sections located one above the other, and the end adapter has a plurality of portions that insert into each of the hollow sections.

BRIEF DESCRIPTION OF THE DRAWINGS

The above and other objects, features, and advantages of the invention will become more apparent from the following description of certain preferred embodiments thereof when taken in conjunction with the accompanying drawings in which:

FIG. 3 is an exploded view of a landscaping timber and flush-mount adapter assembly in accordance with an embodiment of the invention;

FIG. 4 is a cross-sectional view taken on line 4—4 of FIG. 3;

FIG. 5 illustrates cutting an end portion off a landscaping timber in preparation for attaching an end adapter thereto in accordance with the invention;

FIG. 6 is an exploded view of the cut timber and end adapter showing how the end adapter is attached to the timber;

FIG. 7 is a cross-sectional view taken on line 7—7 of FIG. 6;

FIG. 8 is a perspective view of a landscaping timber in accordance with another embodiment of the invention, having an integral storage compartment for storing a spike;

FIG. 9 is a front elevation of the landscaping timber of FIG. 8;

FIG. 10 is a cross-sectional view taken on line 10—10 of FIG. 9; and

FIG. 11 is a cross-sectional view taken on line 11—11 of FIG. 9.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
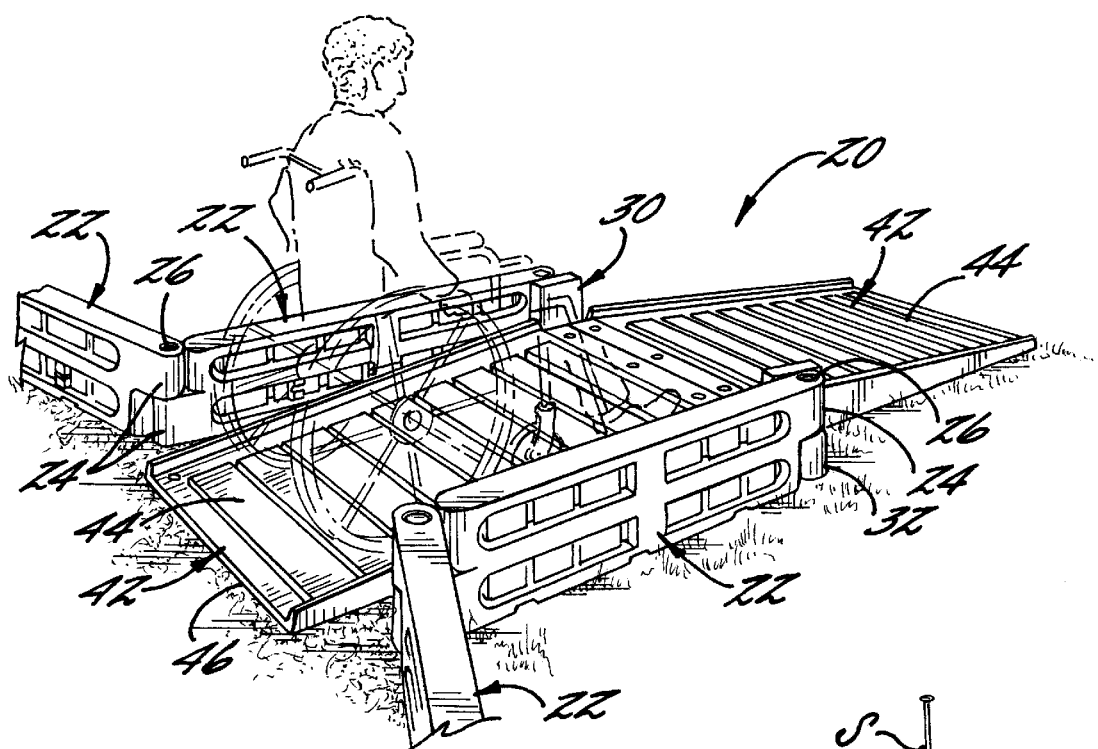
FIG. 1 is a perspective view of a ramp assembly in accordance with one embodiment of the invention.
Figure 2:
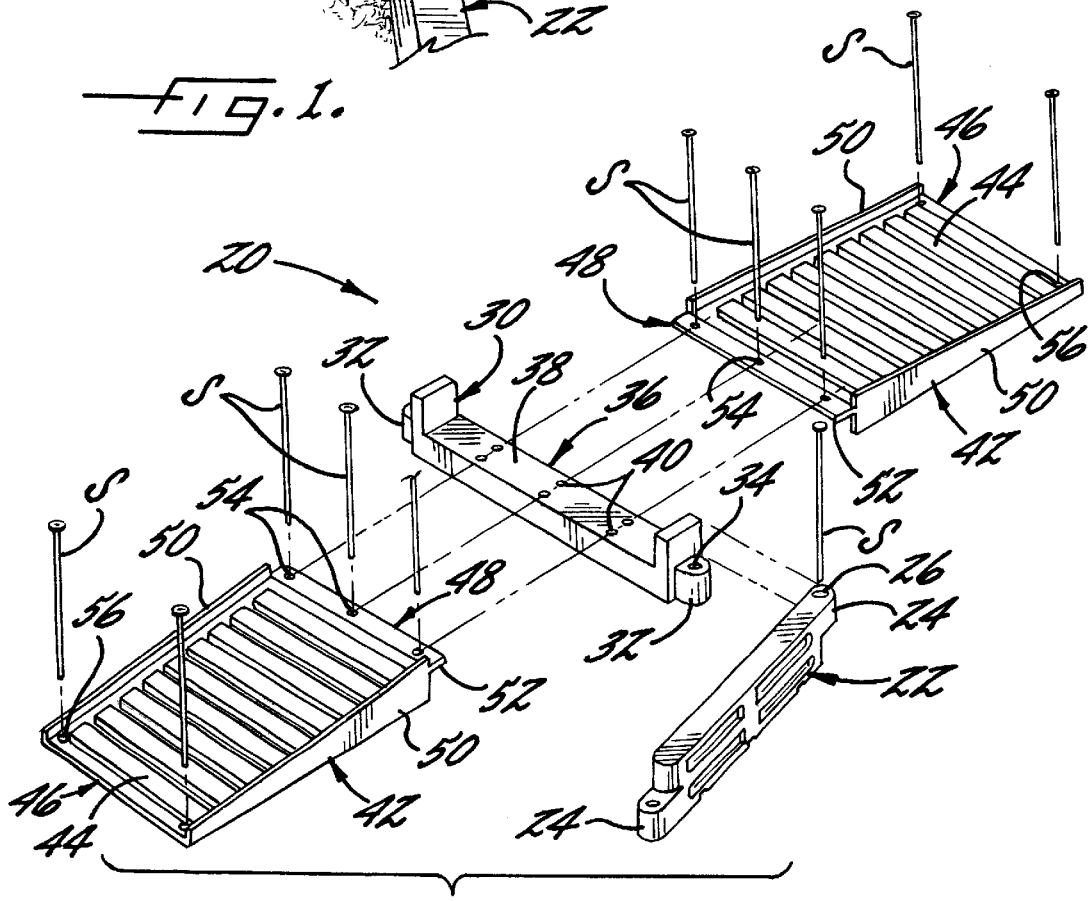
FIG. 2 is an exploded view of the ramp assembly.

FIGS. 1 and 2 depict a ramp assembly 20 in accordance with one preferred embodiment of the invention. The ramp assembly is configured to interface with the ends of a pair of landscaping timbers 22. The end of each landscaping timber 22 includes an end portion 24 whose height is about half that of the main body portion of the timber. The end portion 24 includes an aperture 26 that extends vertically therethrough for receiving an elongate spike S (FIG. 2) that is driven into the ground to attach the timber to the ground. The end portion 24 of the timber forms a stepped configuration that is designed to nestingly mate with a complementarily stepped end of another landscaping timber so that the timbers can be linked end-to-end via the spikes S to form a substantially continuous barrier. Typically, such a barrier will be erected around a perimeter of an area that is to be surfaced with a loose, soft surfacing material such as shredded or chipped wood or the like. However, if it is desired to provide wheelchair access to such an enclosed area, an opening must be provided in the barrier. The ramp assembly 20 facilitates providing the opening in an aesthetically pleasing manner and further provides ramped surfaces allowing a wheelchair or the like to readily access the enclosed area.

The ramp assembly 20 includes a threshold member 30 configured to mate with the end portions 24 of the timbers 22. Each end of the threshold member 30 thus includes a portion 32 configured to nestingly mate with the end portion 24 of the timber. In the illustrated embodiment of the invention, the end portion 24 of the timber is spaced vertically above the ground when the timber is lying flush against the ground. Accordingly, the portion 32 of the threshold member 30 is located against the ground so as to be received beneath the end portion 24 of the timber. However, it will be recognized that alternatively the end portion 24 of the timber could lie flush against the ground and the portion 32 of the threshold member could be spaced vertically above the ground so as to be received on top of the end portion 24. In either case, the portions 32 of the threshold member each includes an aperture 34 for receiving a spike therethrough. Thus, the apertures 34 in the threshold member 30 are aligned with the apertures 26 in the timbers 22 and spikes S are inserted through the aligned apertures and are driven into the ground, thereby attaching the threshold member to the timbers and attaching all of these members to the ground.

The threshold member 30 includes a central portion 36 that extends between the opposite ends of the threshold member. The central portion 36 has a horizontal upper support surface 38 and a plurality of apertures 40 extending vertically through the central portion for receiving spikes S therethrough. The ramp assembly also includes a pair of wedge-shaped ramps 42 that attach to the threshold member 30. Each ramp 42 includes an inclined support surface 44 that slopes upwardly from a thin end 46 to a thick end 48 of the ramp. The ramp 42 includes a pair of side support rails 50 attached to opposite side edges of the support surface 44 and configured to rest upon the ground to support the support surface 44 above the ground. The ramp can also include further support members (not visible in the drawings) on an underside of the support surface 44 for engaging the ground to provide support to interior portions of the support surface 44 so that the surface does not bow or sag under a load.

At the thick end 48 of each ramp 42 there is an attachment portion 52 comprising a plate-shaped extension of the support surface 44 that extends beyond the side rails 50 for a distance equal to about half of a width of the support surface 38 of the threshold member 30. The attachment portion 52 includes apertures 54 for receiving spikes therethrough. The attachment portions 52 of the two ramps 42 rest atop the threshold support surface 38 abutting or closely adjacent each other with their apertures 54 aligned with the apertures 40 in the threshold member, and spikes S are passed through the aligned apertures and are driven into the ground to secure the ramps to the threshold member and to further secure the assembly to the ground. The ramps 42 preferably also include additional apertures 56 at the thin ends of the ramps for receiving additional spikes to further secure the ramps to the ground. The ramp assembly 20 is thus firmly anchored to the ground and provides a stable ramp surface for entering and leaving the area enclosed by the landscape timbers 22.

A second aspect of the invention is illustrated with the aid of FIGS. 3 and 4. In some installations of landscaping timbers 22 having stepped ends as described above, it may be necessary for a free end (i.e., an end not linked to another timber) of one or more timbers to abut a wall W or the like as shown in FIG. 4. It will be appreciated that an opening is thus left between the wall and the timber, which is aesthetically undesirable and also could allow surfacing material to escape. The invention addresses this problem by providing a flush-mount adapter 60 that mounts on the end of the timber to create the appearance of a non-stepped end. The flush-mount adapter 60 is configured generally similarly to the projecting end portion 24 of the timber 22 so that the adapter 60 and the end portion 24 when stacked one atop the other have a combined height equal to that of the main body portion of the timber. The adapter 60 has an aperture 62 extending vertically therethrough for receiving a spike. Preferably, one of the opposite faces of the adapter through which the aperture extends has a recessed area 64 surrounding the aperture for accommodating an enlarged head H of the spike. The adapter 60 is reversible in orientation so that it can be mounted either beneath the end portion 24 of a timber as shown on the left-hand end of the timber in FIG. 3 and as shown in FIG. 4, or on top of the end portion 24 of a timber as shown on the right-hand end of the timber in FIG. 3. When in the latter orientation, the recessed area 64 is on the upper surface of the adapter so that the head H of the spike is received in the recessed area. The spike is driven through the aligned apertures in the timber and adapter and into the ground.

The adapter 60 and timber 22 preferably include complementary surfaces that engage each other to prevent the adapter from rotating about the spike. Thus, the timber 22 in the illustrated embodiment has a convex surface 66, preferably comprising a sector of a cylinder, on the end of the timber facing the adapter. Likewise, the adapter 60 has a concave surface 68, preferably comprising a cylindrical surface, shaped to interlock with the convex surface 66 of the timber when the apertures in the timber and adapter are aligned. Accordingly, when the spike is passed through the aligned apertures, the interlocking surfaces prevent the adapter from rotating about the spike. Of course, it will be appreciated that the non-limiting example of cylindrical surfaces 66, 68 is merely one possibility out of a virtually endless variety of shapes that can be used for the interlocking surfaces.

A further aspect of the invention is illustrated in FIGS. 5 through 7. In some installations of landscape timbers 22 about a perimeter of an area to be enclosed, the length of the perimeter may not be equal to a whole multiple of the length of the timber 22. Consequently, in the past it has generally been the practice to simply increase the perimeter by a fraction of a timber length, and thus increase the total square feet of surface area of the enclosed area, so that the timbers will all link end-to-end to form a closed circle, rectangle, or other shape of continuous barrier about the perimeter. However, this practice necessitates an increase in the volume of surfacing material for covering the ground within the barrier, which may not be desirable. Alternatively, the perimeter can be decreased by a fraction of a timber length, which may also not be desirable. Furthermore, in some installations there may be physical constraints that make it difficult or impossible to increase or decrease the perimeter.

The present invention addresses this problem by providing an end adapter 70 that allows a timber 22 to be cut to a desired length and attached to the end adapter 70 so as to provide a custom-length timber that can be linked to other timbers at both ends. The timber 22 preferably comprises a main body portion 72 that is at least partially hollow; in the illustrated embodiment, the body portion 72 has three hollow sections 74, 76, and 78 located one above another. Each of the hollow sections has a non-varying cross-sectional shape along the lengthwise direction of the timber, so that the timber can be cut at any location along its length at which the hollow sections are present and the resulting openings in the cut end of the timber will have the same shape.

The end adapter 70 has a stepped end portion 80 configured the same as the stepped end portion of the timber. Attached to the stepped end portion 80 is at least one portion, and preferably a plurality of portions 84, 86, and 88, configured to be slidably inserted into the corresponding hollow sections 74, 76, and 78 of the cut end of the timber. The portions 84, 86, and 88 are inserted into the hollow sections of the timber until the stepped end portion 80 of the adapter abuts the end face of the cut end of the timber. The outer surface of the adapter 70 is shaped to smoothly blend with the outer surface of the timber. The stepped end portion 80 includes a spike-receiving aperture 90. The adapter 80 preferably is reversible in orientation so that it can form either an end similar to the right-hand end of the timber 22 or an end similar to the left-hand end of the timber in FIG. 5. Once the adapter is installed on the end of the timber, the timber can be linked at both ends with other timbers.

Still another aspect of the invention is illustrated in FIGS. 8 through 11. One problem experienced with landscape timbers 22 arises when shipping a set of the timbers with the accompanying spikes S. The spikes are typically heavy and, hence, unless properly secured in the carton, can easily shift in transit, which is undesirable. Although the spikes can be prevented from shifting by affixing them to the carton in some fashion, or by packaging the spikes in a separate carton from the timbers, these solutions require extra packaging operations and/or materials. The invention addresses this problem by providing a landscaping timber 22' that includes an integral storage compartment 100 for a spike S. The timber 22' has a generally rectangular cross-sectional shape including a top wall 102, an opposite bottom wall 104, and spaced side walls 106 and 108 extending between the top and bottom walls. The timber 22' is substantially hollow, preferably being molded of plastic. The spike storage compartment 100 is formed in one of the walls of the timber, preferably in the side wall 106, and comprises a recessed receptacle in an exterior surface of the wall. The storage compartment 100 includes at least one pair of resilient, opposed gripping members 110, and preferably includes at least two pairs of such gripping members 110 spaced apart along the compartment. The spike is snapped into place in between the gripping members 110 so that the spike is retained in the compartment.

The storage compartment 100 preferably is symmetrically configured so that the spike can be stored in the compartment with the enlarged head H of the spike facing either end of the timber. In the illustrated embodiment this is accomplished by providing a recessed area 112 in the compartment at each end thereof. The invention makes shipping a set of timbers and spikes a simple matter of snapping a spike into each timber and then packaging the timbers in the usual manner.

Another feature of the invention illustrated in FIGS. 8 and 9 addresses the problem of water accumulating on one side of a timber, which can act like a dam so that the water can eventually flow over the top of the timber, carrying surfacing material with it. The invention addresses this problem by providing one or more weep vents 120 in the bottom surface of the timber so that water can flow under the timber and prevent an excess accumulation of water on one side of the timber. The bottom surface of the timber is substantially planar and the weep vent 120 comprises an indentation in the bottom surface extending from one side to the other side of the timber body. Preferably, there are a plurality of weep vents spaced along the length of the timber.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A molded plastic landscaping timber, comprising:
   a hollow timber body extending longitudinally from a first end to a second end thereof and having a bottom face for engaging the ground and an opposite top face, and having opposite sides extending between the top and bottom faces, each of the ends of the timber body defining an aperture for receiving an elongate rod-shaped spike therethrough such that the landscaping timber can be secured to the ground by driving the spikes through the apertures into the ground; and
   a storage compartment defined in the timber body for storing one of the spikes with the spike extending generally longitudinally along the timber body and being releasably secured to the timber body.

2. The landscaping timber of claim 1, wherein the storage compartment comprises a recessed receptacle in an exterior surface of one of the sides of the timber body.

3. The landscaping timber of claim 2, wherein the receptacle includes resilient, opposed gripping members that receive the spike therebetween with an interference fit.

4. The landscaping timber of claim 2, wherein the receptacle is symmetrically configured such that the spike can be stored in the receptacle with an enlarged head end of the spike at either end of the receptacle.

5. The landscaping timber of claim 1, further comprising at least one weep vent formed in the bottom face of the timber body for allowing water to flow therethrough when the bottom face is against the ground.

6. The landscaping timber of claim 5, further comprising a plurality of weep vents formed in the bottom face.

7. A molded plastic landscaping timber, comprising:
   a hollow timber body extending longitudinally from a first end to a second end thereof and having a bottom face for engaging the ground and an opposite top face, and having opposite sides extending between the top and bottom faces, each of the ends of the timber body defining an aperture for receiving an elongate rod-shaped spike therethrough such that the landscaping timber can be secured to the ground by driving the spikes through the apertures into the ground; and
   at least one weep vent formed in the bottom face of the timber body to allow water to flow therethrough when the bottom face is against the ground.

8. The landscaping timber of claim 7, further comprising a plurality of weep vents formed in the bottom face.

9. The landscaping timber of claim 7, wherein the bottom face is substantially planar and the weep vent comprises an indentation in the bottom face extending from one side to the other side of the timber body.

10. The landscaping timber of claim 7, in combination with an end adapter, the end adapter having one end configured to receive an end portion of the timber body after one of the ends of the timber body having the aperture is cut off, the end adapter having an opposite end that includes an aperture for receiving the spike therethrough, whereby the end adapter allows the length of the landscaping timber to be reduced.

11. The landscaping timber of claim 10, wherein the end adapter has a portion configured to be inserted into an open end of the timber body for mounting the end adapter onto the timber body.

12. The landscaping timber of claim 11, wherein the timber body includes a plurality of hollow sections located one above the other, and the end adapter has a plurality of portions that insert into each of the hollow sections.

13. The landscaping timber of claim 7, in combination with a flush mount adapter, the ends of the timber body being stepped such that the apertures are formed through end portions of the timber body having a height about half that of the timber body between said end portions, the flush mount adapter having a height about half that of the timber body between said end portions and being configured to fit onto one end portion of the timber body so as to give an appearance of a non-stepped end.

14. A molded plastic landscaping timber, comprising:
   a hollow timber body extending longitudinally from a first end to a second end thereof and having a bottom face for engaging the ground and an opposite top face, and having opposite sides extending between the top and bottom faces, each of the ends of the timber body defining an aperture for receiving an elongate rod-shaped spike therethrough such that the landscaping timber can be secured to the ground by driving the spikes through the apertures into the ground, the ends of the timber body being stepped such that the apertures are formed through end portions of the timber body having a height about half that of the timber body between said end portions; and
   a flush mount adapter having a height about half that of the timber body between said end portions and being configured to fit onto one end portion of the timber body so as to give an appearance of a non-stepped end.

15. The landscaping timber of claim 14, wherein the flush mount adapter has an aperture therethrough aligned with the aperture in the end portion of the timber body when the flush mount adapter is fitted onto the end portion, whereby a spike can be inserted through the aligned apertures to secure the flush mount adapter to the timber.

16. The landscaping timber of claim 15, wherein the timber body and the flush mount adapter have cooperating surfaces that prevent the flush mount adapter from rotating about the spike.

17. The landscaping timber of claim 16, wherein the cooperating surfaces comprise a convex surface on the timber body and a concave surface on the flush mount adapter that meshes with the convex surface.

18. The landscaping timber of claim 15, wherein a face of the flush mount adapter through which the aperture extends has a recess surrounding the aperture for accommodating an enlarged head of the spike.

19. A ramp assembly for a landscaping timber system having a plurality of landscaping timbers that have complementary ends that nestingly fit together and are secured to each other by elongate rod-shaped spikes that are inserted through apertures in the ends of the timbers and are driven into the ground to attach the timbers to the ground, the ramp assembly comprising:
   a threshold member having opposite ends configured to mate with the ends of two spaced-apart landscaping timbers, the ends of the threshold member having apertures positioned to be aligned with the apertures in the ends of the landscaping timbers such that spikes can be inserted through the aligned apertures to secure the threshold member to the landscaping timbers and to the ground, the threshold member having a central portion extending between the opposite ends;
   a pair of wedge-shaped ramps each having an inclined upper surface that slopes upward from a thin end to a thick end of the ramp, the thick ends of the ramps being attached to the central portion of the threshold member, the ramps including apertures for receiving spikes therethrough into the ground.

20. The ramp assembly of claim 19, wherein the central portion of the threshold member defines a substantially horizontal support surface spaced above a ground-engaging bottom of the threshold member and having apertures for receiving spikes therethrough into the ground, and wherein the ramps have attachment portions that overlie the support surface of the threshold member and that have apertures positioned to be aligned with the apertures in the threshold member such that spikes can be inserted through the aligned apertures and driven into the ground.

21. The ramp assembly of claim 20, wherein each of the ramps has a support configured to engage the ground when the attachment portion of the ramp is resting upon the support surface of the threshold member such that the majority of load supported on the ramp is borne by the support.

* * * * *